US006737175B2

(12) United States Patent
Ramanarayanan et al.

(10) Patent No.: US 6,737,175 B2
(45) Date of Patent: May 18, 2004

(54) METAL DUSTING RESISTANT COPPER BASED ALLOY SURFACES

(75) Inventors: Trikur Anantharaman Ramanarayanan, Somerset, NJ (US); Changmin Chun, Lawrenceville, NJ (US); James Dirickson Mumford, Long Valley, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 279 days.

(21) Appl. No.: 10/017,009

(22) Filed: Dec. 7, 2001

(65) Prior Publication Data

US 2003/0029528 A1 Feb. 13, 2003

Related U.S. Application Data

(62) Division of application No. 09/922,331, filed on Aug. 3, 2001, now abandoned.

(51) Int. Cl.[7] .......................... B32B 15/20; B32B 31/00
(52) U.S. Cl. ...................... 428/674; 148/527; 148/532; 148/536; 148/902; 422/240; 422/241; 428/675; 428/676; 428/677; 428/926
(58) Field of Search ................. 428/674, 675, 428/676, 677, 926; 148/527, 532, 536, 902; 422/240, 241

(56) References Cited

U.S. PATENT DOCUMENTS

| 1,841,910 A | 1/1932 | Pier et al. ............... 518/721 |
|---|---|---|
| 1,848,466 A | 3/1932 | Edmonds et al. ........... 422/193 |
| 2,234,568 A | 3/1941 | Linckh ....................... 518/719 |
| 2,621,202 A | 12/1952 | Peukert et al. .............. 518/706 |
| 4,224,087 A | 9/1980 | Tachikawa et al. ........... 148/98 |
| 4,436,790 A | 3/1984 | Prinz et al. ................. 428/675 |
| 5,405,525 A | 4/1995 | Heyse et al. ................ 208/133 |
| 5,406,014 A | 4/1995 | Heyse et al. ................ 585/444 |
| 5,413,700 A | 5/1995 | Heyse et al. ................ 208/134 |
| 5,575,902 A | 11/1996 | Heyse et al. ............. 208/48 R |
| 5,593,571 A | 1/1997 | Heyse et al. ................ 208/134 |
| 5,658,452 A | 8/1997 | Heyse et al. ............. 208/48 R |
| 5,674,376 A | 10/1997 | Heyse et al. ................ 208/135 |
| 5,676,821 A | 10/1997 | Heyse et al. ................ 208/135 |
| 5,723,707 A | 3/1998 | Heyse et al. ................ 585/444 |
| 5,849,969 A | 12/1998 | Heyse et al. ................ 585/483 |
| 5,863,418 A | 1/1999 | Heyse et al. ................ 208/135 |
| 5,866,743 A | 2/1999 | Heyse et al. ................ 585/486 |

FOREIGN PATENT DOCUMENTS

| GB | 448187 | 6/1936 |
|---|---|---|
| GB | 1157658 | 7/1969 |
| GB | 1157660 | 7/1969 |
| GB | 2066696 A | 7/1981 |

OTHER PUBLICATIONS

Editor T. B. Massalski: Binary Alloy Phase Diagrams, vol. 1, 1987. American Society for Metals, Ohio, USA, XP002219539, p. 917 (no month).

*Primary Examiner*—Robert R. Koehler
(74) *Attorney, Agent, or Firm*—Estelle C. Bakun; Charles J. Brumlik

(57) ABSTRACT

A method for inhibiting metal dusting corrosion of surfaces exposed to supersaturated carbon environments comprising constructing said surfaces of, or coating said surfaces with a copper based alloy. The invention is also directed to a composition resistant to metal dusting.

3 Claims, 7 Drawing Sheets

METAL DUSTING RESISTANT COPPER BASED ALLOY SURFACES

This is a Divisional, of the application Ser. No. 09/922,331, filed Aug. 3, 2001, now abandoned.

FIELD OF THE INVENTION

The invention herein described, includes alloys which are resistant to metal dusting.

BACKGROUND OF THE INVENTION

High temperature alloys which are Fe, Ni, or Co based are prone to a virulent form of corrosion known as metal dusting when subjected to environments which are supersaturated with carbon. The problem is generally encountered at temperatures ranging from 300–850° C. Many processes of interest to the petrochemical industry which involve carbon-supersaturated environments, are limited by the lack of available reactor materials and heat exchanger materials that are resistant to metal dusting. Research has led to some understanding of the underlying mechanisms. For the Fe-based systems, the mechanism involves the initial formation of a metastable $Fe_3C$ carbide on the alloy surface in the carbon-supersaturated environments. Subsequently, graphite deposits on the metastable carbide whereby it is destabilized and decomposes to iron particles and carbon, thus triggering the corrosion process. For Ni based and Co based systems, while no metastable surface carbide forms, graphite deposition on the metal provides channels through which the metal can migrate out. In addition, carbon also supersaturates the metal and causes profuse graphite precipitation in the interior, thus leading to a breaking up of the bulk metal.

The carbon-supersaturated environment that is encountered in process streams consists of either hydrocarbon molecules or carbon monoxide. Of these, the latter is a more virulent metal dusting molecule. Heyse and coworkers have proposed carburization and metal dusting resistant coating systems that are applicable to hydroalkylation processes where hydrocarbon is the main corrosive medium. The general approach to control metal dusting is the use of alloys that can form protective surface oxide films in the environment involved. But in most currently available alloy systems, the break up of the protective surface oxide film leads to local metal dusting corrosion.

Current approaches to control metal dusting involve the use of $H_2S$ as a gas phase corrosion inhibitor, expensive high temperature alloys and tin based coatings for selected applications involving hydrocarbon corrosives (See for example, Heyse, et.al. U.S. Pat. No. 5,863,418). However, even the more expensive alloys are not fully metal dusting resistant. Coating systems, especially based on tin, have limited applications in predominantly hydrocarbon environments. The use of $H_2S$ necessitates clean up of the downstream process gas. Further, in many catalytic processes, $H_2S$ can be a catalyst poison. Thus, its use is rather limited.

Certain coating materials have been taught in the prior art. For example, see U.S. Pat. No. 5,575,902 which teaches the use of Group VIB metals, specifically chromium for coating surfaces susceptible to carburization.

What is needed in the art are materials that are highly resistant to metal dusting corrosion in petrochemical processes where supersaturated carbon environments are present.

SUMMARY OF THE INVENTION

Figure 1:
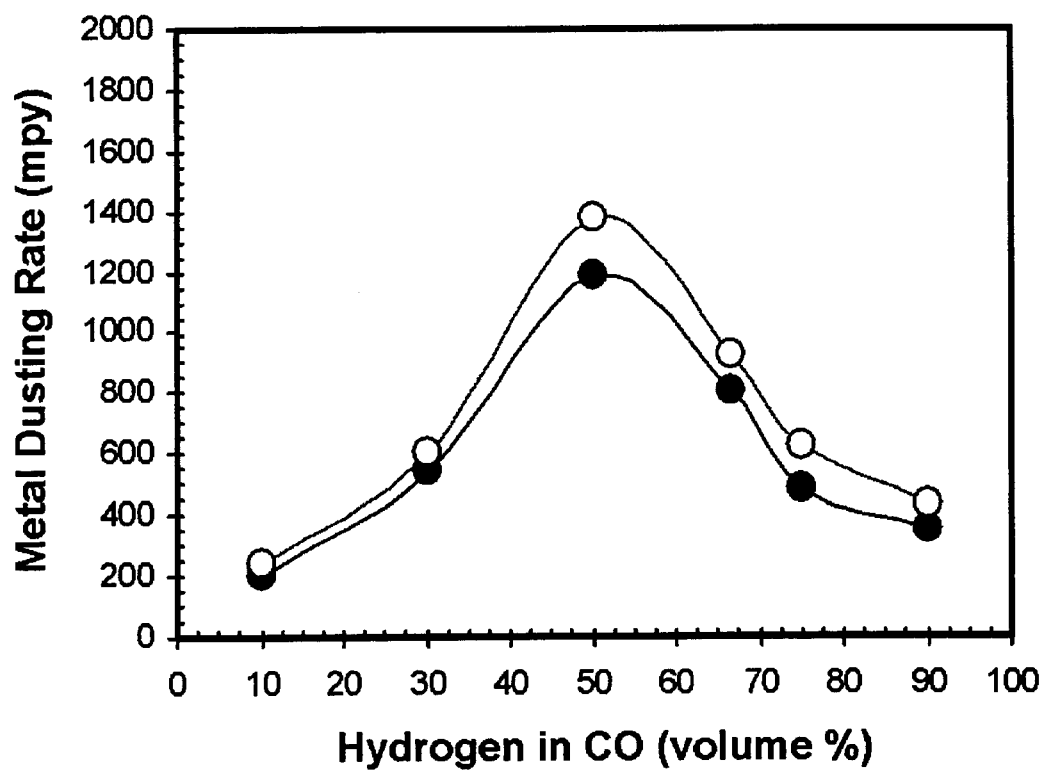
FIG. 1 depicts the metal dusting rate (mpy) of Fe-1.25 Cr-0.5 Mo alloy as a function of $CO—H_2$ gas mixture at 538° C. (1000° F.). The hollow circles are the local rate and the solid circles are the general rate.

An aspect of the invention comprises a composition resistant to metal dusting when exposed to a carbon supersaturated environment at temperatures up to about 650° C. comprising an alloy selected from the group consisting of copper-tin alloys, copper-gallium alloys copper-aluminum alloys, and mixtures thereof, wherein when said alloy is a copper-tin alloy, the amount of tin will range from about 0.1 to about 2 wt % when exposed to carbon supersaturated environments at temperatures of about 500 to about 650° C., about 0.1 to about 5 wt % when exposed to carbon supersaturated environments at temperatures of about 400 to about 500° C., and about 0.1 to about 8 wt % when exposed to carbon supersaturated environments at temperatures up to about 400° C., and wherein when said alloy is a copper-gallium alloy, the amount of gallium will range from about 0.1 to about 2 wt % when exposed to carbon supersaturated environments at temperatures of about 500 up to about 650° C., and from about 0.1 to about 5 wt % for temperatures up to about 500° C., and wherein when said alloy is an copper-aluminum alloy, the amount of aluminum will range from about 0.1 to about 4 wt % when exposed to carbon supersaturated environments at temperatures of about 500 to about 650° C., about 0.1 to about 8 wt % when exposed to carbon supersaturated environments at temperatures up to about 500° C. and wherein when said mixture is a copper-tin-gallium alloy, the amount of tin and gallium combined will be about 0.1 to about 5 wt % when exposed to carbon supersaturated environments at temperatures up to about 500° C. and about 0.1 to about 2 wt % when exposed to carbon supersaturated environments at temperatures of about 500 to about 650° C. and wherein when said mixture is a copper-tin-aluminum alloy, the amount of aluminum will be about 0.1 to about 8 wt % and the amount of tin will be about 0.1 to about 5 wt % when exposed to carbon supersaturated environments at temperatures up to about 500° C. and the amount of aluminum will be about 0.1 to about 4 wt % and the amount of tin will be about 0.1 to about 2 wt % when exposed to carbon supersaturated environments at temperatures of about 500 to about 650° C. and wherein when said mixture is a copper-gallium-aluminum alloy the amount of gallium will be about 0.1 to about 5 wt % and the amount of aluminum will be about 0.1 to about 8 wt % when exposed to carbon supersaturated environments at temperatures up to about 500° C. and the amount of gallium will be about 0.1 to about 2 wt % and the amount of aluminum will be about 0.1 to about 4 wt % when exposed to carbon supersaturated environments at temperatures of about 500 to about 650° C., and wherein when said mixture is a copper-tin-gallium-aluminum alloy, said alloy will contain about 0.1 to about 5 wt % of gallium and tin combined and about 0.1 to about 8 wt % aluminum when exposed to carbon supersaturated environments at temperatures up to about 500° C. and about 0.1 to about 2 wt % of gallium and tin combined and about 0.1 to about 4 wt % aluminum when exposed to carbon supersaturated environments of between about 500 and about 650° C.

Another aspect of the invention is directed to a method for inhibiting metal dusting of surfaces exposed to supersaturated carbon environments comprising constructing said surfaces of, or coating said surfaces with an alloy selected from the group consisting of copper-tin alloys, copper-gallium alloys copper-aluminum alloys, and mixtures thereof, wherein when said alloy is a copper-tin alloy, the amount of tin will range from about 0.1 to about 2 wt % when exposed to carbon supersaturated environments at temperatures of about 500 to about 650° C., about 0.1 to about 5 wt % when exposed to carbon supersaturated environments at temperatures of about 400 to about 500° C., and about 0.1 to about 8 wt % when exposed to carbon supersaturated environments at temperatures up to about 400° C., and wherein when said alloy is a copper-gallium alloy, the amount of gallium will range from about 0.1 to about 2 wt % when exposed to carbon supersaturated environments at temperatures of about 500 up to about 650° C., and from about 0.1 to about 5 wt % for temperatures up to about 500° C., and wherein when said alloy is an copper-aluminum alloy, the amount of aluminum will range from about 0.1 to about 4 wt % when exposed to carbon supersaturated environments at temperatures of about 500 to about 650° C., about 0.1 to about 8 wt % when exposed to carbon supersaturated environments at temperatures up to about 500° C. and wherein when said mixture is a copper-tin-gallium alloy, the amount of tin and gallium combined will be about 0.1 to about 5 wt % when exposed to carbon supersaturated environments at temperatures up to about 500° C. and about 0.1 to about 2 wt % when exposed to carbon supersaturated environments at temperatures of about 500 to about 650° C. and wherein when said mixture is a copper-tin-aluminum alloy, the amount of aluminum will be about 0.1 to about 8 wt % and the amount of tin will be about 0.1 to about 5 wt % when exposed to carbon supersaturated environments at temperatures up to about 500° C. and the amount of aluminum will be about 0.1 to about 4 wt % and the amount of tin will be about 0.1 to about 2 wt % when exposed to carbon supersaturated environments at temperatures of about 500 to about 650° C. and wherein when said mixture is a copper-gallium-aluminum alloy the amount of gallium will be about 0.1 to about 5 wt % and the amount of aluminum will be about 0.1 to about 8 wt % when exposed to carbon supersaturated environments at temperatures up to about 500° C. and the amount of gallium will be about 0.1 to about 2 wt % and the amount of aluminum will be about 0.1 to about 4 wt % when exposed to carbon supersaturated environments at temperatures of about 500 to about 650° C., and wherein when said mixture is a copper-tin-gallium-aluminum alloy, said alloy will contain about 0.1 to about 5 wt % of gallium and tin combined and about 0.1 to about 8 wt % aluminum when exposed to carbon supersaturated environments at temperatures up to about 500° C. and about 0.1 to about 2 wt % of gallium and tin combined and about 0.1 to about 4 wt % aluminum when exposed to carbon supersaturated environments of between about 500 and about 650° C.

A carbon super-saturated environment is herein defined as an environment where the thermodynamic activity of carbon is greater than unity.

DETAILED DESCRIPTION

In many high temperature (300 to 850° C.) hydrocarbon-processing applications, structural components such as reactors and heat exchangers can be degraded by a carbon-induced corrosion known as metal dusting. Since the rate of such corrosion can sometimes exceed ~25 millimeters per year (1000 mils per year), controlling it is important for both economic and safety reasons.

One aspect of the invention herein described uses a metal that suppresses graphite deposition, which is an essential step in metal dusting corrosion, and thereby controls metal dusting. For practical use such a metal must be economically attractive and reasonably high melting. In the present invention, copper and copper-based alloys are utilized as the surface contacting the carbon super-saturated environment which causes metal dusting corrosion.

The invention is specifically applicable, but not limited, to process streams where $CO-H_2$ mixtures constitute the predominant metal dusting medium.

The copper or copper based alloys can either be used to construct the apparatus surfaces which are susceptible to metal dusting such as reactors, or, alternatively, a coating of copper or copper based alloy can be utilized to protect an underlying surface susceptible to metal dusting.

When utilizing coatings, the copper or copper alloys can be applied to the surfaces to be protected by any technique known in the art for such an application. For example, plating, cladding, painting, chemical vapor deposition, sputtering etc.

When utilized as a coatings, the thickness of such coatings will range from about 10 to about 200 microns, preferably from about 50 to about 100 microns, or alternatively about 2 to about 100 microns in thickness.

Alternatively, these compositions can be directly used as metal dusting resistant alloys. When used either as coatings or as alloys, the range of application is expressed by the following table.

| METAL | TEMPERATURE ° C. | AMOUNT WT % |
|---|---|---|
| Cu—Sn | Up to about 650 | About 0.1–about 2 wt % Sn |
| Cu—Sn | Up to about 500 | About 0.1–about 5 Sn |
| Cu—Sn | Up to about 400 | About 0.1 to about 8 wt % Sn |
| Cu—Ga | Up to about 650 | About 0.1 to about 2 wt % Ga |
| Cu—Ga | Up to about 500 | About 0.1 to about 5 wt % Ga |
| Cu—Al | Up to about 650 | About 0.1 to about 4 wt % Al |
| Cu—Al | Up to about 500 | About 0.1 to about 8 wt % Al |
| Cu—Sn—Ga | Up to about 650 | About 0.1 to about 2 wt % of Sn and Ga combined |
| Cu—Sn—Ga | Up to about 500 | About 0.1 to about 5 wt % of Sn and Ga combined |
| Cu—Sn—Al | Up to about 650 | About 0.1 to about 2 wt % Sn and about 0.1 to about 4 wt % Al |

-continued

| METAL | TEMPERATURE °C. | AMOUNT WT % |
|---|---|---|
| Cu—Sn—Al | Up to about 500 | About 0.1 to about 5 wt % Sn and about 0.1 to about 8 wt % Al |
| Cu—Ga—Al | Up to about 650 | About 0.1 to about 2 wt % Ga and about 0.1 to about 4 wt % Al |
| Cu—Ga—Al | Up to about 500 | About 0.1 to about 5 wt % Sn and about 0.1 to about 8 wt % Al |
| Cu—Sn—Ga—Al | Up to about 650 | About 0.1 to about 2 wt % of Sn and Ga combined and about 0.1 to about 4 wt % Al |
| Cu—Sn—Ga—Al | Up to about 500 | About 0.1 to about 5 wt % of Sn and Ga combined and about 0.1 to about 8 wt % Al |

Surfaces susceptible to metal dusting, as described herein include those surfaces of an apparatus or reactor system that are in contact with carbon supersaturated environments at any time during use, including heat exchangers, piping, etc.

When a mixture of the above alloys is utilized, if the alloy is being exposed to a carbon supersaturated environment at temperatures up to about 500° C. any combination of metals is acceptable. However, for temperatures of about 500 to about 650° C., the alloy should contain no more than about 2 wt % Sn and Ga combined.

EXAMPLES

Rectangular coupons of Fe-1.25 Cr-0.5 Mo alloy, which is considered for application as a heat exchanger material, were exposed to different CO—$H_2$ mixtures in a thermogravimetric unit at 1000° F. (538° C.). In each case, the corrosion rate was measured by microscopically measuring the recession of the alloy surface with respect to an inert marker. A plot of the metal dusting rate as a function of the hydrogen content in a CO—$H_2$ gas mixture is shown in FIG. 1. The metal dusting rate is seen to go through a maximum corresponding to the 50 CO: 50 $H_2$ gas mixture. Therefore, this gas mixture composition is used as the corrosive environment in all the example studies.

Figure 2:
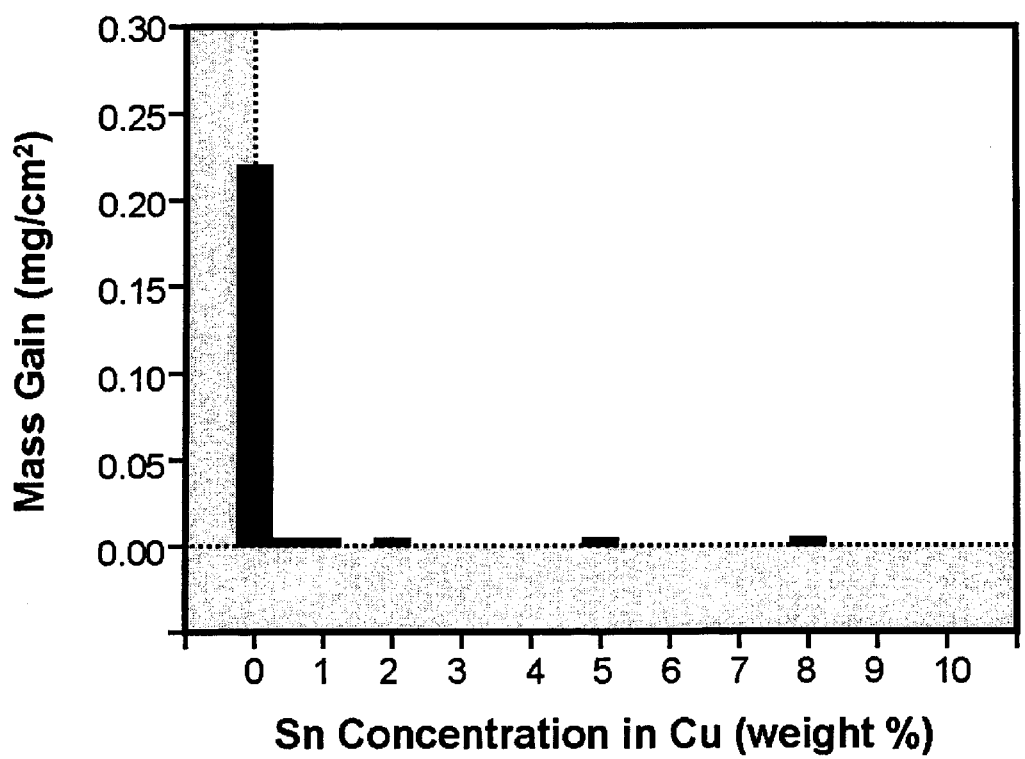
FIG. 2 depicts the mass gain due to carbon deposition (a measure of metal dusting corrosion) of Cu-xSn alloys as a function of Sn content at 500° C. in 50 $CO$:50 $H_2$ gas mixture after 65 hours of corrosion.

The resistance of Cu and Cu-Sn alloys to metal dusting corrosion at 500° C. is shown in FIG. 2. Since metal dusting is generally accompanied by carbon deposition, the dusting rate correlates with mass gain due to carbon deposition. While copper itself is quite resistant to metal dusting corrosion, the addition of Sn significantly improves the corrosion resistance.

Figure 3:
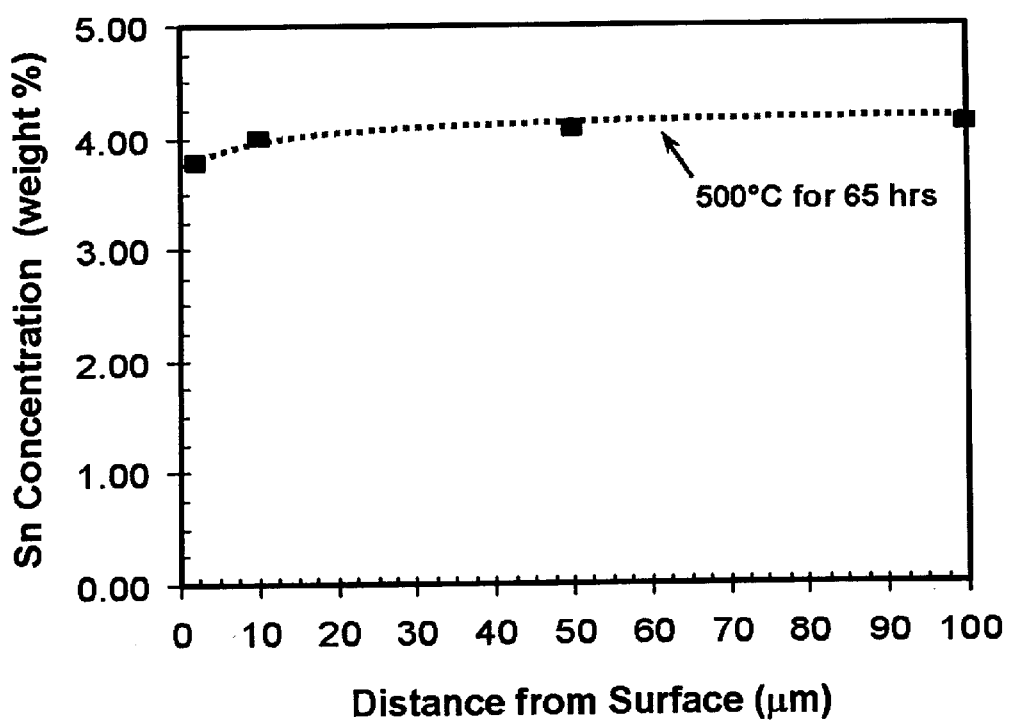
FIG. 3 depicts the concentration profile of Sn in Cu-5Sn alloy as a function of distance from the surface after corrosion in 50 $CO$:50 $H_2$ gas mixture at 500° C. after 65 hours.
Figure 4:
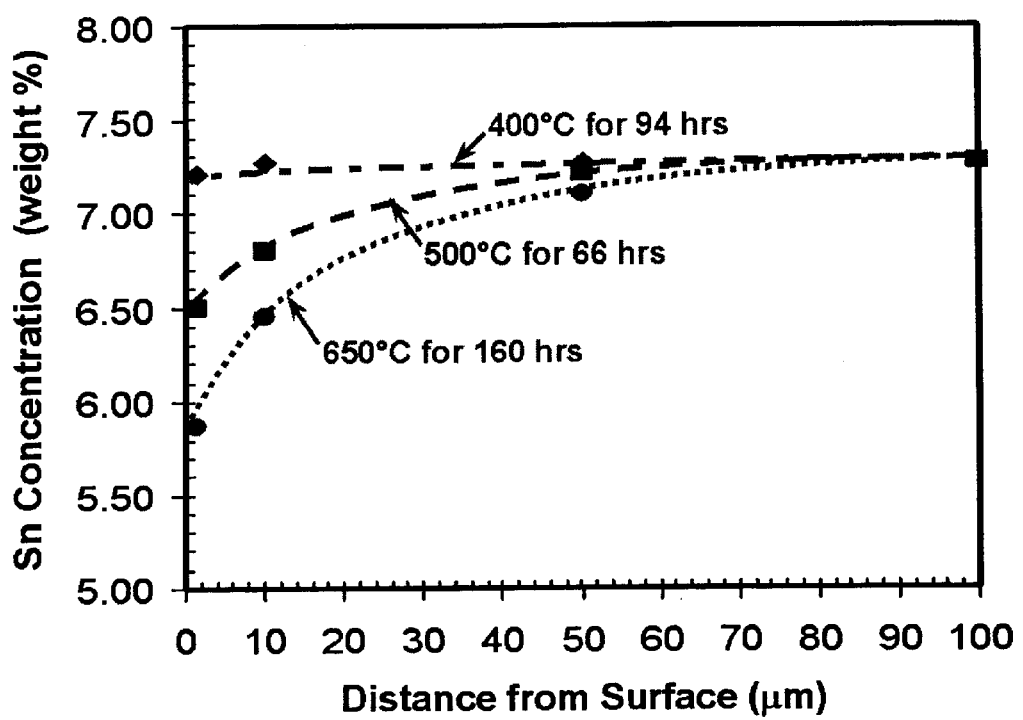
FIG. 4 depicts the concentration profile of Sn in Cu-8Sn alloy as a function of distance from the surface after corrosion in 50 $CO$:50 $H_2$ gas mixture (a) at 650° C. for 160 hours
(b) at 500° C. for 66 hours
(c) at 400° C. for 94 hours
Figure 5:
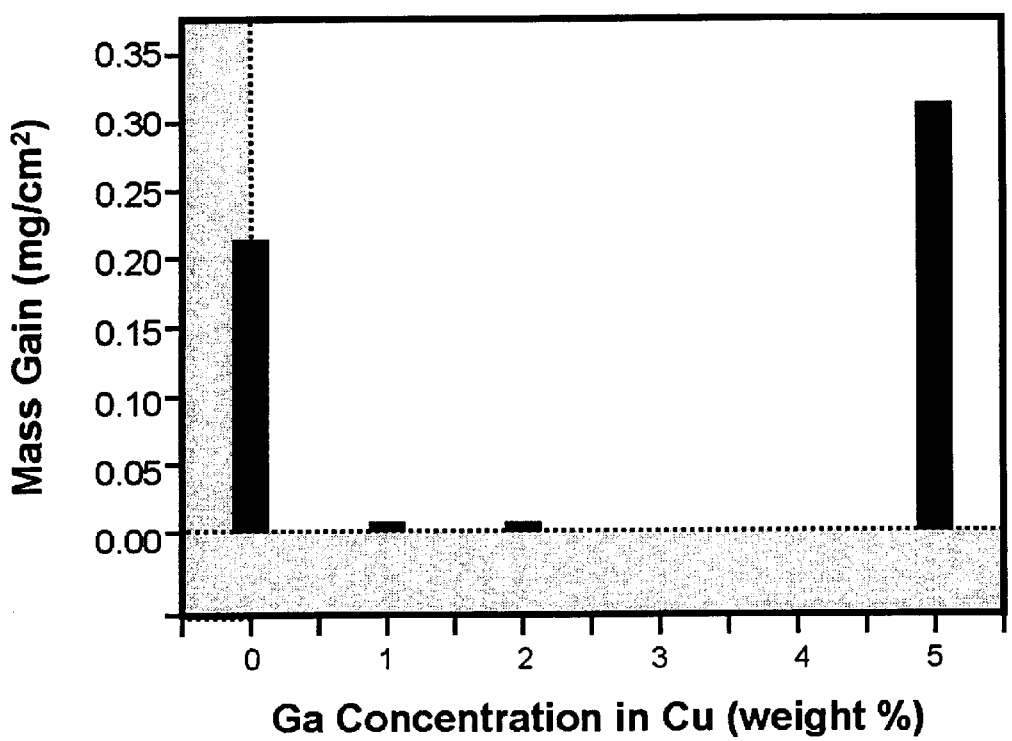
FIG. 5 depicts the mass gain due to carbon deposition of Cu-xGa alloy as a function of Ga content at 500° C. in 50 $CO$:50 $H_2$ gas mixture after 65 hours of corrosion.
Figure 6:
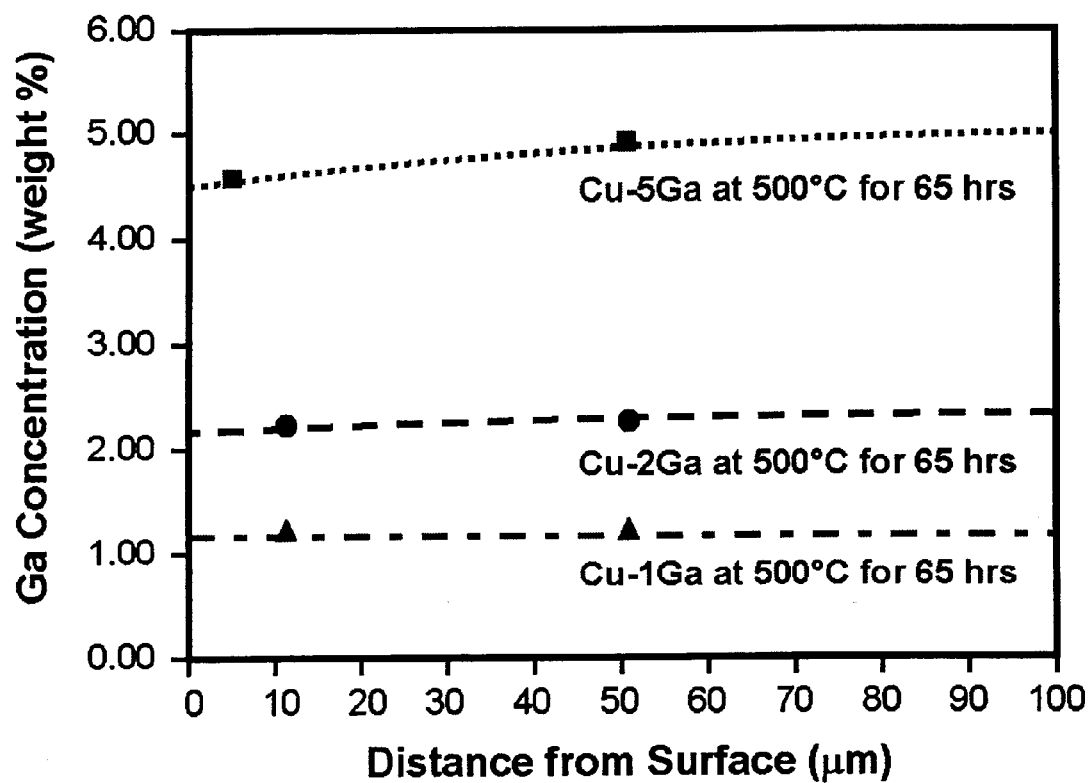
FIG. 6 depicts the concentration profile of Ga in Cu-5Ga, Cu-2Ga, and Cu-1 Ga alloys as a function of distance from the surface after corrosion in 50 $CO$:50 $H_2$ gas mixture at 500° C. after 65 hours.
Figure 7:
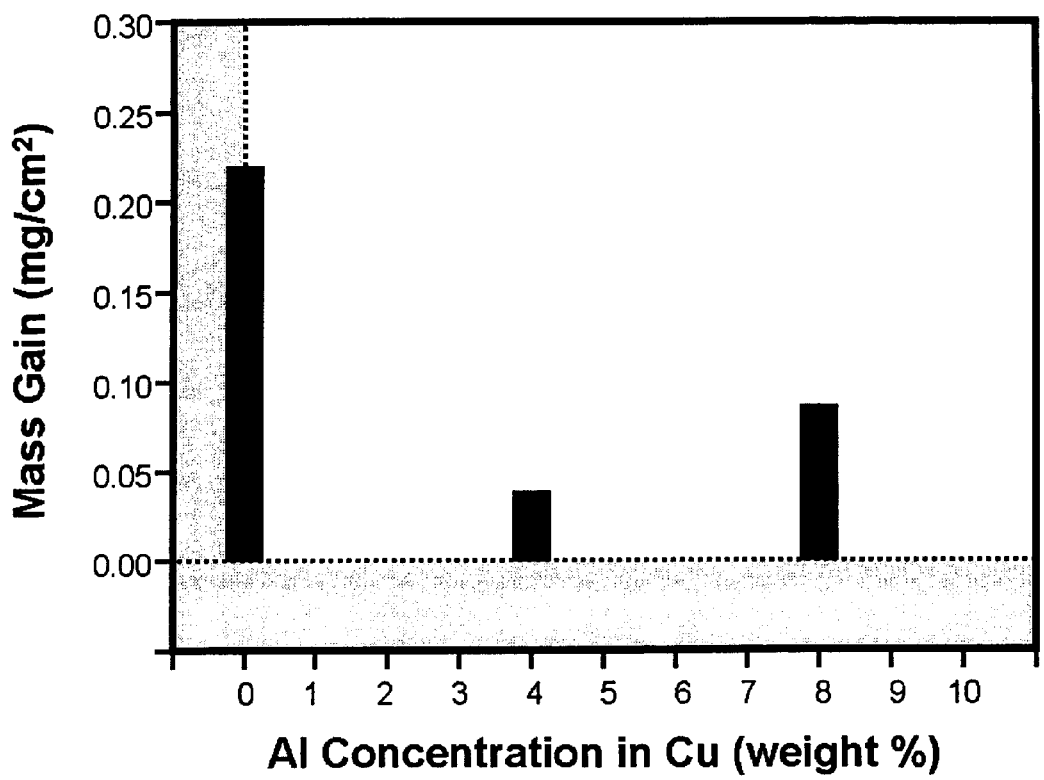
FIG. 7 depicts the mass gain due to carbon deposition of Cu-xAl alloy as a function of Al content at 500° C. in 50 $CO$:50 $H_2$ gas mixture after 65 hour of corrosion at 500° C.

The maximum temperature of application depends upon the Sn content. This is because Sn tends to vaporize at high temperatures. As shown in FIG. 3, a Cu-5Sn alloy or coating can be used up to about 500° C. Above this temperature, the performance deteriorates due to Sn vaporization. For Cu-8Sn alloy, FIG. 4, 400° C. is an acceptable upper temperature limit.

What is claimed is:
1. An apparatus having surfaces which are exposed to carbon supersaturated environments during operation having a coating thereon resistant to metal dusting environments wherein said coating is a composition resistant to metal dusting when exposed to a carbon super-saturated environment at temperatures up to about 650° C. comprising an alloy selected from the group consisting of copper-tin alloys, copper-gallium alloys copper-aluminum alloys, and mixtures thereof, wherein when said alloy is a copper-tin alloy, the amount of tin will range from about 0.1 to about 2 wt % when exposed to carbon supersaturated environments at temperatures of about 500 to about 650° C., about 0.1 to about 5 wt % when exposed to carbon supersaturated environments at temperatures of about 400 to about 500° C., and about 0.1 to about 8 wt % when exposed to carbon supersaturated environments at temperatures up to about 400° C., and wherein when said alloy is a copper-gallium alloy, the amount of gallium will range from about 0.1 to about 2 wt % when exposed to carbon supersaturated environments at temperatures of about 500 up to about 650° C., and from about 0.1 to about 5 wt % for temperatures up to about 500° C., and wherein when said alloy is an copper-aluminum alloy, the amount of aluminum will range from about 0.1 to about 4 wt % when exposed to carbon supersaturated environments at temperatures of about 500 to about 650° C., about 0.1 to about 8 wt % when exposed to carbon supersaturated environments at temperatures up to about 500° C. and wherein when said mixture is a copper-tin-gallium alloy, the amount of tin and gallium combined will be about 0.1 to about 5 wt % when exposed to carbon supersaturated environments at temperatures up to about 500° C. and about 0.1 to about 2 wt % when exposed to carbon supersaturated environments at temperatures of about 500 to about 650° C. and wherein when said mixture is a copper-tin-aluminum alloy, the amount of aluminum will be about 0.1 to about 8 wt % and the amount of tin will be about 0.1 to about 5 wt % when exposed to carbon supersaturated environments at temperatures up to about 500° C. and the amount of aluminum will be about 0.1 to about 4 Wt % and the amount of tin will be about 0.1 to about 2 wt % when exposed to carbon supersaturated environments at temperatures of about 500 to about 650° C. and wherein when said mixture is a copper-gallium-aluminum alloy the amount of gallium will be about 0.1 to about 5 wt % and the amount of aluminum will be about 0.1 to about 8 wt % when exposed to carbon supersaturated environments at temperatures up to about 500° C. and the amount of gallium will be about 0.1 to about 2 wt % and the amount of aluminum will be about 0.1 to about 4 wt % when exposed to carbon supersaturated environments at temperatures of about 500 to about 650° C., and wherein when said mixture is a copper-tin-gallium-aluminum alloy, said alloy will contain about 0.1 to about 5 wt % of gallium and tin combined and about 0.1 to about 8 wt % aluminum when exposed to carbon supersaturated environments at temperatures up to about 500° C. and about 0.1 to about 2 wt % of gallium and tin combined and about 0.1 to about 4 wt % aluminum when exposed to carbon supersaturated environments of between about 500 and about 650° C.

2. A method for inhibiting metal dusting of surfaces exposed to supersaturated carbon environments comprising constructing said surfaces of, or coating said surfaces with an alloy selected from the group consisting of copper-tin alloys, copper-gallium alloys copper-aluminum alloys, and mixtures thereof, wherein when said alloy is a copper-tin alloy, the amount of tin will range from about 0.1 to about 2 wt % when exposed to carbon supersaturated environments at temperatures of about 500 to about 650° C., about 0.1 to about 5 wt % when exposed to carbon supersaturated environments at temperatures of about 400 to about 500° C., and about 0.1 to about 8 wt % when exposed to carbon supersaturated environments at temperatures up to about 400° C., and wherein when said alloy is a copper-gallium alloy, the amount of gallium will range from about 0.1 to about 2 wt % when exposed to carbon supersaturated environments at temperatures of about 500 up to about 650°

C., and from about 0.1 to about 5 wt % for temperatures up to about 500° C., and wherein when said alloy is an copper-aluminum alloy, the amount of aluminum will range from about 0.1 to about 4 wt % when exposed to carbon supersaturated environments at temperatures of about 500 to about 650° C., about 0.1 to about 8 wt % when exposed to carbon supersaturated environments at temperatures up to about 500° C. and wherein when said mixture is a copper-tin-gallium alloy, the amount of tin and gallium combined will be about 0.1 to about 5 wt % when exposed to carbon supersaturated environments at temperatures up to about 500° C. and about 0.1 to about 2 wt % when exposed to carbon supersaturated environments at temperatures of about 500 to about 650° C. and wherein when said mixture is a copper-tin-aluminum alloy, the amount of aluminum will be about 0.1 to about 8 wt % and the amount of tin will be about 0.1 to about 5 wt % when exposed to carbon supersaturated environments at temperatures up to about 500° C. and the amount of aluminum will be about 0.1 to about 4 wt % and the amount of tin will be about 0.1 to about 2 wt % when exposed to carbon supersaturated environments at temperatures of about 500 to about 650° C. and wherein when said mixture is a copper-gallium-aluminum alloy the amount of gallium will be about 0.1 to about 5 wt % and the amount of aluminum will be about 0.1 to about 8 wt % when exposed to carbon supersaturated environments at temperatures up to about 500° C. and the amount of gallium will be about 0.1 to about 2 wt % and the amount of aluminum will be about 0.1 to about 4 wt % when exposed to carbon supersaturated environments at temperatures of about 500 to about 650° C., and wherein when said mixture is a copper-tin-gallium-aluminum alloy, said alloy will contain about 0.1 to about 5 wt % of gallium and tin combined and about 0.1 to about 8 wt % aluminum when exposed to carbon supersaturated environments at temperatures up to about 500° C. and about 0.1 to about 2 wt % of gallium and tin combined and about 0.1 to about 4 wt % aluminum when exposed to carbon supersaturated environments of between about 500 and about 650° C.

3. The method of claim 2 wherein when said surfaces are coated, said metal coating ranges from about 2 to about 100 microns in thickness.

* * * * *